Aug. 18, 1925.  1,549,962
R. S. BURDETTE
AIR BAG AND METHOD OF CONSTRUCTING THE SAME
Filed Sept. 24, 1921

Inventor
Richard S. Burdette

Philip E. Barnes

By R. D. Rogers
Attorney

Patented Aug. 18, 1925.

1,549,962

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

AIR BAG AND METHOD OF CONSTRUCTING THE SAME.

Application filed September 24, 1921. Serial No. 502,965.

*To all whom it may concern:*

Be it known that I, RICHARD S. BURDETTE, a citizen of the United States, and resident of Akron, Ohio, have invented new and useful Improvements in Air Bags and Methods of Constructing the Same, of which the following is a specification.

My invention relates to improvements in air bags of the type designed for use in the manufacture and repair of pneumatic tire casings, and to methods of constructing the article.

Air bags of the above designated character are extensively used as expansible cores for forcing the walls of a tire casing outwardly against the walls of a mold, or against a wrapping, generally used in the tire manufacturing industry during the process of vulcanizing the casing, all of which will be readily understood in the art and needs no further explanation. Since expansive action of the air bag is required only in a direction radially of its major axis, it will be readily understood that the ideal air bag is one in which elongation, in a longitudinal direction, is substantially obviated, or at least reduced to a minimum, without in any way retarding its capabilities for expansive action in a radial direction.

I have discovered a practical combination of materials, and have devised a plan of assembly thereof with the particular object in view of providing an air bag structure which, although it is inherently highly resilient, will expand, under internal pressure, substantially, in one direction only.

The invention, furthermore, is directed toward providing in an air bag, embodying the above described characteristics certain structural features designed respectively to strengthen the article at the zones where the greatest stresses and strains occur, without in any way impairing the uniform expansion of the bag throughout its entire length.

In the drawings, accompanying and forming a part of this specification and wherein I have illustrated one practical embodiment of the invention:

Figure 1:
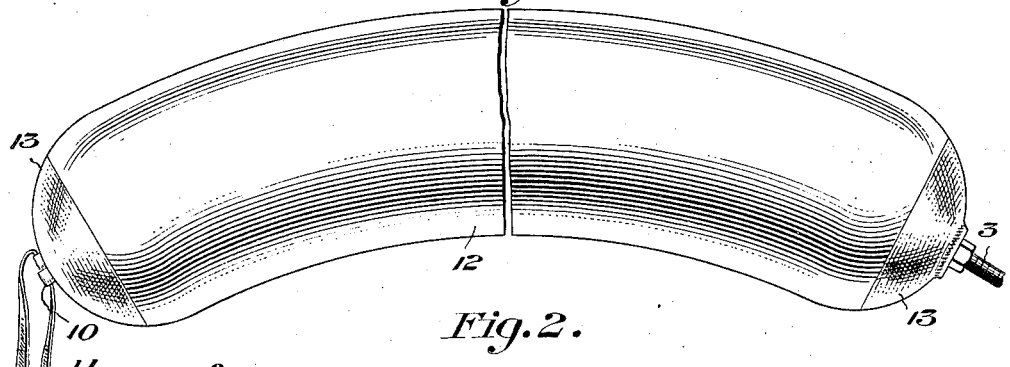
Fig. 1 is a side elevation, partly broken away, of a finished air bag constructed in accordance with my invention.
Figure 2:
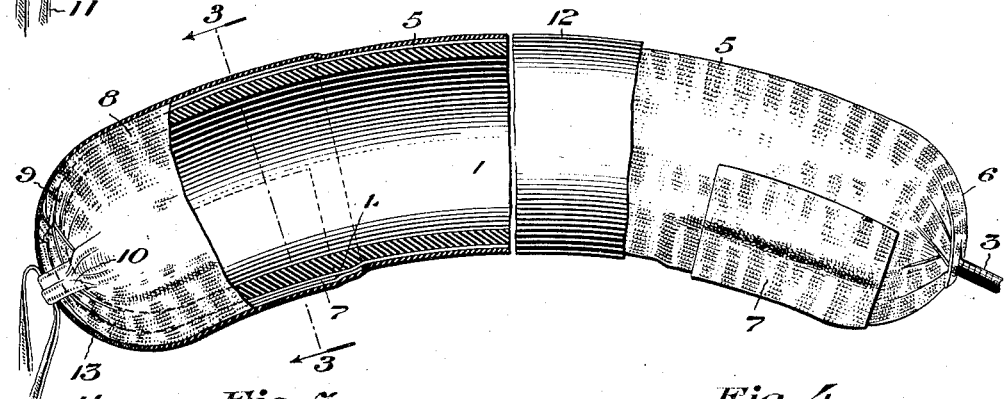
Fig. 2 is a view, partly in section and partly in side elevation, illustrating the arrangement of the materials and reinforcing elements.
Figure 3:
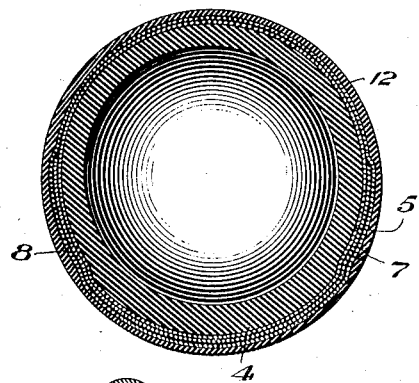
Fig. 3 is a transverse section, on an enlarged scale, taken on the line 3—3 of Fig. 2.
Figure 5:
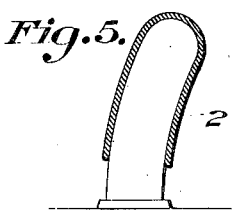
Fig. 5 is a diagrammatic view illustrating a step in the construction of the air bag.
Figure 6:
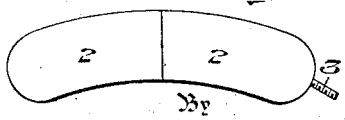
Fig. 6 is a diagrammatic side elevation illustrating another step in the construction thereof.

In practicing my invention, I first form, of green or partially vulcanized rubber, a container of the type designated by the numeral 1 of the drawings. The container may be constructed as a straight tube, with either closed or opened ends, or it may be formed initially in the arc of a circle, as indicated in the drawings. Preferably, it is first constructed in tubular half sections 2, one of which is shown in Fig. 5 of the drawings, each section being open at one end, the open ends of the sections being subsequently abutted and joined together by any suitable expedient, as indicated in Fig. 2. Any preferred type of valve such as that designated by the numeral 3, may be affixed in the closed end of one of the sections, either before they are joined together or afterwards, whereby fluid, such as air, under pressure may be admitted into the container to expand it, as will be readily understood.

Figure 4:
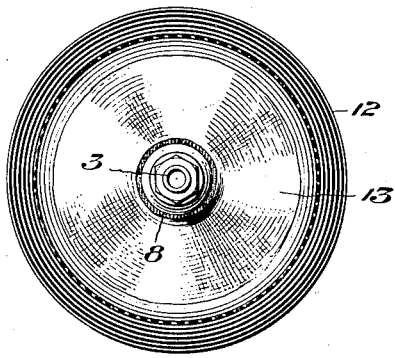
Fig. 4 is an enlarged view of one end of the bag.

In actual practice, I have found that when this type of bag is used in conjunction with a certain type of mold, the greatest strains and stresses occur, under internal pressure, adjacent the juncture of the end portions with the shorter side of the bag, i. e., the shorter peripheral portion. In order to reinforce the bag throughout the areas thus indicated, I preferably provide, as one expedient, an increased thickness of material to include these zones, as shown in Fig. 4, and this form of reinforcement may be extended as far around the end portions of the container as may be found advisable.

The container is provided with a casing 5 that is designed to completely enclose it, and to stretch, with a minimum degree of resistance, and in effect, in a diametrical direction only relative thereto. Various expedients may be resorted to in providing a casing that comprises such characteristics, without departing from the spirit of my invention, but, as shown in the drawings, I prefer to utilize a material, such as cord fabric, which comprises rubberized or impregnated cords arranged in parallelism without the use of weft threads. The casing of my invention is so arranged relative to the container that the cords of the material extend substantially axially of the container throughout the length thereof. A casing of such material may be properly positioned around the container by rolling it thereon, or by first forming a tubular structure of the cord fabric, and then inserting the container therein. Furthermore, the casing may be formed of as many plies as desired.

To more readily conform the ends of the casing 5 to the contour of the ends of the container 1, and also to provide for the escape of air from between these two elements for a purpose presently apparent, I preferably slit the edges of the sheet of cord fabric material, either before or after the tube is formed, and overlap such portions in the manner indicated at 6.

If desirable further reinforcements, in the nature of patches, preferably cord fabric patches, may be provided, as indicated at 7, to strengthen the casing against excessive wear at the zones of greatest stresses and strains, and these patches are likewise disposed with the cords of the fabric in parallelism with the axis of the container. At each end of the casing I have found it expedient to again reinforce the structure throughout a portion of its length, and have, therefore, elected to utilize a cuff or thimble reinforcement 8, also formed of cord fabric, that is arranged with the cords lying in parallelism with the cords of the casing, and those of the patch 7. The outer ends of the respective cuffs 8 are also slit in the manner previously described with reference to the casing, and are overlapped, as indicated at 9 in Fig. 2 of the drawings. The cuff at the end of the casing opposite the valve stem 3 is cut to provide a loop designated 10, through which a suitable bail, such as that shown at 11, may be inserted for use in handling the bag. The structure thus formed, with the exception of the extreme end portions, is next coated with a relatively thin layer of rubber, or rubber composition, designated 12, and the ends covered by fabric caps 13. The structure is now vulcanized in a mold, fluid under pressure having been first admitted into the container through the valve stem 3, and the various elements and materials are hereby unified and formed into a composite structure in which the various cords of the casing, and the reinforcements heretofore described, function to restrict, or prevent, any stretching action of the container in a longitudinal or axial direction. At the same time, and as will be readily understood, the full capacity for stretch in the opposite, or radial, direction that is inherent in the material of the container, as well as the casing, is in no way impaired, owing to the manner in which the cords of the casing and the fabric reinforcements are arranged. In an air bag that embodies such characteristics, as above set forth, the full force of the pressure that is introduced therein is utilized in expanding the walls of the bag, and, consequently, the tire casing against the inclosing mold or wrapping. Therefore, the operator may secure more satisfactory results with less fluid pressure than would be necessary with other types of bags. Moreover, he is enabled to accurately gage the effects of a given amount of pressure within the bag, a result heretofore difficult to accomplish. By overlapping the ends of the container and the cuffs or thimbles 8, as previously described, and covering these overlapped ends with the fabric caps 13, any entrapped air which might form between the materials is free to escape during vulcanization, and the formation of air pockets in the walls of the bag is thus prevented.

Although I have illustrated a single embodiment of my invention and described it in specific detail, it is to be understood that the disclosure is merely illustrative and is not designed to restrict the invention either in scope or spirit unless such restrictions are indicated in the claims appended hereto.

What I claim is:

1. A unitary container comprising a non-metallic core adapted to receive fluid under pressure and to be expanded thereby in one direction only relative to its major axis.

2. A unitary tubular container comprising a non-metallic core adapted to receive fluid under pressure and to be expanded thereby in a radial direction only with respect to its major axis.

3. A unitary tubular container for receiving fluid under pressure comprising a non-metallic core and reinforced resilient walls adapted to be expanded in one direction only relative to the major axis of the container.

4. A unitary tubular container for receiving fluid under pressure comprising a non-metallic core and reinforced resilient walls adapted to be expanded in a radial direction only with respect to the major axis of the container.

5. A unitary tubular container for receiving fluid under pressure comprising a non-metallic core and reinforced resilient walls of vulcanized material adapted to be expanded in one direction only relative to the major axis of the container.

6. A unitary tubular container for receiving fluid under pressure comprising a non-metallic core and reinforced resilient walls of vulcanized material adapted to be expanded in a radial direction only with respect to the major axis of the container.

7. A unitary tubular container adapted to be expanded by internal pressure comprising resilient walls having means incorporated therein arranged to restrict expansive action of the container in one direction and to permit expansive action in a direction normal to the direction of the restricted expansion.

8. A unitary tubular container adapted to be expanded by internal pressure comprising resilient walls having means incorporated therein arranged to restrict expansive action of the container in the direction of its major axis and to permit such action in a direction radially with respect to said axis.

9. An integral air bag adapted to be expanded by internal pressure comprising resilient walls having flexible elements incorporated therein arranged to restrict stretching action of the walls in one direction only and to permit such action in the transverse direction.

10. An air bag adapted to be expanded by internal pressure comprising resilient walls of vulcanized material having flexible cord elements incorporated therein arranged in parallelism with the major axis of the bag.

11. An elongate air bag adapted to be expanded by internal pressure comprising resilient walls encased in a layer of flexible elements arranged to restrict stretching action of the walls in one direction only, and a layer of similar elements disposed adjacent each end of the bag in parallelism with said first elements.

12. An air bag comprising a closed elongate container formed of resilient vulcanizable material and adapted to be expanded by internal fluid pressure, a casing for the container comprising flexible elements adapted to be incorporated with said material by the process of vulcanization to restrict expansive action of the container in a longitudinal direction only, a layer of flexible elements surrounding each end of the casing and disposed in parallelism with said first elements one of said last layers being constructed to provide a projecting loop at the end of the bag, and a cap element for each end of the bag one of said elements being slotted to receive said loop.

13. The herein described method that comprises, constructing a fluid tight receptacle of vulcanizable resilient material, applying means to reinforce it against stretching action in one direction and incorporating the reinforcing means therewith by the process of vulcanization.

14. The herein described method that comprises, constructing a receptacle in half sections of vulcanizable resilient material, assembling the sections, applying means to reinforce it against stretching action in one direction, and incorporating the reinforcing means therewith through the process of vulcanization.

15. The herein described method that comprises, constructing a fluid tight elongate receptacle of vulcanizable material, applying means to reinforce it against elongation, and incorporating the reinforcing means therewith through the process of vulcanization.

16. The herein described method that comprises, constructing an elongate receptacle in sections of vulcanizable resilient material, applying means to reinforce the sections against elongation, assembling the sections, and incorporating the reinforcing means therewith through the process of vulcanization.

17. The herein described method that comprises constructing an elongate receptacle in sections of resilient vulcanizable material, assembling the sections, applying means to reinforce the assembled article against elongation, applying a coating of vulcanizable material over portions of the structure thus formed, and vulcanizing the article.

18. An expansible air bag for receiving fluid under pressure having walls reinforced with cord fabric, and additional reinforcements at the end of the bag.

19. An expansible air bag for receiving fluid under pressure embodying walls reinforced with cord fabric elements disposed longitudinally of said container.

20. An integral air bag for receiving fluid under pressure embodying a non-metallic core and resilient walls adapted to be expanded only in one direction.

21. A tubular container for receiving fluid under pressure provided with end reinforcing caps of cord fabric, the elements on opposite sides of one of said caps being joined to form a loop at one end of said container.

22. A tubular container for receiving fluid under pressure provided with end reinforcing caps of cord fabric, the elements on opposite sides of one of said caps being joined to form a loop at one end of said container.

23. A tubular container for receiving fluid under pressure provided with an end cap of fibrous material having a loop formed therein for receiving means for handling the bag, and a fabric disc having a hole in the center thereof adapted to receive said loop, said fibrous material and said disc being vulcanized into a composite mass.

24. A tubular air tight container composed of a material which is non-stretchable in one direction and is adapted to stretch in a direction at right-angles thereto.

25. An expansible airbag for receiving fluid under pressure having walls reinforced with cord fabric and additional reinforcements of cord fabric at either end of the bag.

In witness whereof, I have hereunto signed my name.

RICHARD S. BURDETTE.